(12) United States Patent
Nitta et al.

(10) Patent No.: US 11,543,628 B2
(45) Date of Patent: Jan. 3, 2023

(54) CAMERA LENS

(71) Applicant: AAC Optics Solutions Pte. Ltd., Singapore (SG)

(72) Inventors: Koji Nitta, Osaka (JP); Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 352 days.

(21) Appl. No.: 16/854,907

(22) Filed: Apr. 22, 2020

(65) Prior Publication Data
US 2021/0302697 A1    Sep. 30, 2021

(30) Foreign Application Priority Data
Mar. 25, 2020   (JP) .............................. JP2020-054966

(51) Int. Cl.
*G02B 9/64*    (2006.01)
*G02B 13/00*   (2006.01)
*G02B 27/00*   (2006.01)

(52) U.S. Cl.
CPC .......... *G02B 13/0045* (2013.01); *G02B 9/64* (2013.01); *G02B 27/0025* (2013.01)

(58) Field of Classification Search
CPC .............................. G02B 13/0045; G02B 9/64
See application file for complete search history.

(56) References Cited

U.S. PATENT DOCUMENTS

2019/0204556 A1\* 7/2019 Jhang ...................... G02B 3/04

\* cited by examiner

*Primary Examiner* — Joseph P Martinez
(74) *Attorney, Agent, or Firm* — W&G Law Group (57) ABSTRACT

The present invention provides a camera lens consisting of eight lenses and having a small height, a wide angle, and good optical properties. The camera lens includes, sequentially from an object side, a first lens having a positive refractive power; a second lens having a negative refractive power; a third lens; a fourth lens having a positive refractive power; a fifth lens; a sixth lens; a seventh lens having a positive refractive power; and an eighth lens having a negative refractive power. The camera lens satisfies specific conditions.

2 Claims, 8 Drawing Sheets

CAMERA LENS

TECHNICAL FIELD

The present invention relates to a camera lens, and particularly, to a camera lens, which consists of eight lenses, is suitable for portable module cameras that adopt high-pixel Charge Coupled Device (CCD), Complementary Metal-Oxide Semiconductor Sensor (CMOS), or other imaging elements, and has a small height of TTL (a total optical length)/IH (an image height)<1.35, a wide angle (i.e., a full field of view, hereinafter referred to as 2ω) above 80° and good optical properties.

BACKGROUND

In recent years, various imaging devices using imaging elements such as CCDs and CMOSs are widely applied. With the development of miniaturization and high performance of these imaging elements, it is urgent to develop a camera lens with a small height, a wide angle, and good optical properties.

The technologies in terms of the camera lens consisting of eight lenses and having a small height, a wide angle, and good optical properties are driven to be developed. As a camera lens having a structure of eight lenses, a camera lens is provided to include a first lens having a positive refractive power, a second lens having a negative refractive power, a third lens having a negative refractive power, a fourth lens having a positive refractive power, a fifth lens having a negative refractive power, a sixth lens having a positive refractive power, a seventh lens having a positive refractive power and an eighth lens having a negative refractive power that are sequentially arranged from an object side.

Regarding the camera lens disclosed in the prior art, a ratio of an abbe number of the first lens and an abbe number of the second lens, a ratio of the abbe number of the first lens and an abbe number of the third lens, as well as a ratio of an on-axis distance from an image side surface of the fifth lens to an object side surface of the sixth lens and a focal length of the camera lens are insufficient, so that the height reduction is insufficient.

SUMMARY

A purpose of the present invention is to provide a camera lens consisting of eight lenses and having a small height, a wide angle, and good optical properties.

For the above purpose, the applicant has intensively studied a power configuration of each lens, the ratio of the abbe number of the first lens and the abbe number of the second lens, the ratio of the abbe number of the first lens and the abbe number of the third lens, and the ratio of an on-axis distance from the image side surface of the fifth lens to the object side surface of the sixth lens and the focal length of the camera lens, and has obtained a camera lens of the present invention which can solve the technical problems in the related art.

A camera lens according to a first technical solution includes, sequentially from an object side, a first lens having a positive refractive power; a second lens having a negative refractive power; a third lens; a fourth lens having a positive refractive power; a fifth lens; a sixth lens; a seventh lens having a positive refractive power; and an eighth lens having a negative refractive power. The camera lens satisfies following conditions:

$$3.00 \leq v1/v2 \leq 5.00;$$

$$3.00 \leq v1/v3 \leq 5.00; \text{ and}$$

$$0.06 \leq d10/f \leq 0.12,$$

where
v1 denotes an abbe number of the first lens;
v2 denotes an abbe number of the second lens;
v3 denotes an abbe number of the third lens;
f denotes a focal length of the camera lens; and
d10 denotes an on-axis distance from an image side surface of the fifth lens to an object side surface of the sixth lens.

The camera lens according to a second technical solution further satisfies a following condition:

$$-0.35 \leq f1/f2 \leq -0.10,$$

where
f1 denotes a focal length of the first lens; and
f2 denotes a focal length of the second lens.

The camera lens according to a third technical solution further satisfies a following condition:

$$3.00 \leq f7/f \leq 25.00,$$

where
f denotes the focal length of the camera lens; and
f7 denotes a focal length of the seventh lens.

Technical Effects

According to the present invention, particularly provided is a camera lens, which consists of eight lenses, is suitable for portable module cameras that adopt high-pixel CCD, CMOS, or other imaging elements, has a small height of TTL (total optical length)/IH (image height)<1.35, guarantees a wide angle of 2ω>80°, and also has good optical properties.

DESCRIPTION OF EMBODIMENTS

The embodiments of the camera lens according to the present invention will be described below. The camera lens LA is provided with a lens system. The lens system is a eight-lens structure and includes a first lens L1, a second lens L2, a third lens L3, a fourth lens L4, a fifth lens L5, a sixth lens L6, a seventh lens L7 and an eighth lens L8 that are arranged from an object side to an image side. A glass plate GF is arranged between the eighth lens L8 and an image plane. A cover glass plate and various filters can be considered as the glass flat plate GF. In the present invention, the glass plate GF may be arranged at different positions, or may also be omitted.

The first lens L1 is a lens having a positive refractive power, the second lens L2 is a lens having a negative refractive power, the third lens L3 is a lens having a positive or negative refractive power, the fourth lens L4 is a lens having a positive refractive power, the fifth lens L5 is a lens having a positive or negative refractive power, the sixth lens L6 is a lens having a positive or negative refractive power, the seventh lens L7 is a lens having a positive refractive power, and the eighth lens L8 is a lens having a negative refractive power. In order to correct various aberrations, it is desirable to design all surfaces of these eight lenses as aspherical surfaces.

The camera lens LA satisfies the following conditions (1) to (3):

$$3.00 \leq v1/v2 \leq 5.00 \quad (1);$$

$$3.00 \leq v1/v3 \leq 5.00 \quad (2); \text{ and}$$

$$0.06 \leq d10/f \leq 0.12 \quad (3),$$

where v1 denotes an abbe number of the first lens;
v2 denotes an abbe number of the second lens;
v3 denotes an abbe number of the third lens;
f denotes a focal length of the camera lens; and
d10 denotes an on-axis distance from an image side surface of the fifth lens to an object side surface of the sixth lens.

The condition (1) specifies a ratio of the abbe number v1 of the first lens L1 to the abbe number v2 of the second lens L2. If it is outside the range of condition (1), a correction of on-axis and off-axis aberrations becomes difficult due to wide-angle and low-height, which is not preferable.

The condition (2) specifies a ratio of the abbe number v1 of the first lens L1 to the abbe number v3 of the third lens L3. If it is outside the range of condition (2), a correction of on-axis and off-axis aberrations becomes difficult due to wide-angle and low-height, which is not preferable.

The condition (3) specifies a ratio of the on-axis distance d10 from the image side surface of the fifth lens L5 to the object side surface of the sixth lens L6 to the focal length of the camera lens. If it is outside the range of condition (3), a correction of on-axis and off-axis aberrations becomes difficult due to wide-angle and low-height, which is not preferable.

The camera lens LA satisfies the following condition (4):

$$-0.35 \leq f1/f2 \leq -0.10 \quad (4),$$

where f1 denotes a focal length of the first lens; and
f2 denotes a focal length of the second lens.

The condition (4) specifies a ratio of the focal length f1 of the first lens L1 to the focal length f2 of the second lens L2. If it is within the range of condition (4), a camera lens having a small height, a wide angle, and good optical properties can be easily achieved, which is preferable.

The camera lens LA satisfies the following condition (5):

$$3.00 \leq f7/f \leq 25.00 \quad (5),$$

where f denotes the focal length of the camera lens; and
f7 denotes a focal length of the seventh lens.

The condition (5) specifies a ratio of the focal length f7 of the seventh lens L7 to the focal length f of the camera lens. If it is within the range of condition (5), a camera lens having a small height, a wide angle, and good optical properties can be easily achieved, which is preferable.

The eight lenses of the camera lens LA satisfy the above construction and conditions, so as to obtain the camera lens consisting of eight lenses and having a small height of TTL (a total optical length)/IH (an image height)<1.35, 2ω>80°, and good optical properties.

Embodiments

The camera lens LA of the present invention will be described with reference to the embodiments below. The reference signs described in the embodiments are listed below. In addition, the distance, radius and center thickness are all in a unit of mm.

f: focal length of the camera lens LA;
f1: focal length of the first lens L1;
f2: focal length of the second lens L2;
f3: focal length of the third lens L3;
f4: focal length of the fourth lens L4;
f5: focal length of the fifth lens L5;
f6: focal length of the sixth lens L6;
f7: focal length of the seventh lens L7;
f8: focal length of the eighth lens L8;
Fno: F number;
2ω: full field of view;
S1: aperture;
R: curvature radius of an optical surface, a central curvature radius for a lens;
R1: curvature radius of an object side surface of the first lens L1;
R2: curvature radius of an image side surface of the first lens L1;
R3: curvature radius of an object side surface of the second lens L2;
R4: curvature radius of an image side surface of the second lens L2;
R5: curvature radius of an object side surface of the third lens L3;
R6: curvature radius of an image side surface of the third lens L3;
R7: curvature radius of an object side surface of the fourth lens L4;
R8: curvature radius of an image side surface of the fourth lens L4;
R9: curvature radius of an object side surface of the fifth lens L5;
R10: curvature radius of the image side surface of the fifth lens L5;
R11: curvature radius of the object side surface of the sixth lens L6;
R12: curvature radius of an image side surface of the sixth lens L6;
R13: curvature radius of an object side surface of the seventh lens L7;
R14: curvature radius of an image side surface of the seventh lens L7;
R15: curvature radius of an object side surface of the eighth lens L8;
R16: curvature radius of an image side surface of the eighth lens L8;
R17: curvature radius of an object side surface of the glass plate GF;

R18: curvature radius of an image side surface of the glass plate GF;

d: center thickness or distance between lenses;

d0: on-axis distance from the aperture S1 to the object side surface of the first lens L1;

d1: center thickness of the first lens L1;

d2: on-axis distance from the image side surface of the first lens L1 to the object side surface of the second lens L2;

d3: center thickness of the second lens L2;

d4: on-axis distance from the image side surface of the second lens L2 to the object side surface of the third lens L3;

d5: center thickness of the third lens L3;

d6: on-axis distance from the image side surface of the third lens L3 to the object side surface of the fourth lens L4;

d7: center thickness of the fourth lens L4;

d8: on-axis distance from the image side surface of the fourth lens L4 to the object side surface of the fifth lens L5;

d9: center thickness of the fifth lens L5;

d10: on-axis distance from the image side surface of the fifth lens L5 to the object side surface of the sixth lens L6;

d11: center thickness of the sixth lens L6;

d12: on-axis distance from the image side surface of the sixth lens L6 to the object side surface of the seventh lens L7;

d13: center thickness of the seventh lens L7;

d14: on-axis distance from the image side surface of the seventh lens L7 to the object side surface of the eighth lens L8;

d15: center thickness of the eighth lens L8;

d16: on-axis distance from the image side surface of the eighth lens L8 to the object side surface of the glass plate GF;

d17: center thickness of the glass plate GF;

d18: on-axis distance from the image side surface of the glass plate GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

nd7: refractive index of d line of the seventh lens L7;

nd8: refractive index of d line of the eighth lens L8;

ndg: refractive index of d line of the glass plate GF;

v: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

v8: abbe number of the eighth lens L8;

vg: abbe number of the glass plate GF;

TTL: total optical length (on-axis distance from the object side surface of the first lens L1 to the image plane); and LB: on-axis distance from the image side surface of the eighth lens L8 to the image plane (including the thickness of the glass plate GF).

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (6)$$

For convenience, the aspheric surface of each lens surface uses the aspheric surface defined in the equation (6). However, the present invention is not limited to the aspherical polynomial defined in the equation (6).

First Embodiment

Figure 1:
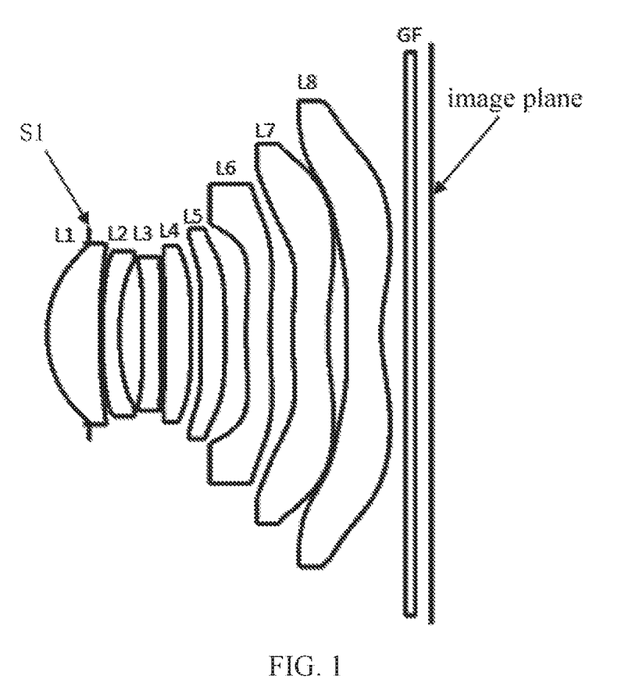
FIG. 1 is a schematic diagram of a camera lens LA according to a first embodiment of the present invention.

FIG. 1 is a schematic diagram of a camera lens LA according to a first embodiment of the present invention. The curvature radiuses R of the image side surfaces and object side surfaces of the first lens L1 to the eighth lens L8 of the camera lens LA according to the first embodiment, the center thicknesses of the lenses, or distances d between the lenses, refractive indexes nd, abbe numbers v are shown in Table 1; conic coefficients k and aspheric coefficients are shown in Table 2; and 2ω, Fno, f, f1, f2, f3, f4, f5, f6, f7, f8, TTL, and IH are shown in Table 3.

TABLE 1

|  | R | d |  | nd |  | vd | Effective radius (mm) |
|---|---|---|---|---|---|---|---|
| S1 | ∞ | d0 = | −0.876 |  |  |  | 1.933 |
| R1 | 2.49718 | d1 = | 1.092 | nd1 | 1.5267 | v1 76.60 | 1.932 |
| R2 | 13.43018 | d2 = | 0.050 |  |  |  | 1.830 |
| R3 | 11.51021 | d3 = | 0.351 | nd2 | 1.6250 | v2 25.25 | 1.762 |
| R4 | 5.34307 | d4 = | 0.466 |  |  |  | 1.550 |
| R5 | 26.30713 | d5 = | 0.380 | nd3 | 1.6250 | v3 25.25 | 1.550 |
| R6 | 13.79843 | d6 = | 0.088 |  |  |  | 1.650 |
| R7 | 105.12352 | d7 = | 0.552 | nd4 | 1.5346 | v4 55.69 | 1.740 |
| R8 | −20.74078 | d8 = | 0.201 |  |  |  | 1.882 |
| R9 | 52.12262 | d9 = | 0.500 | nd5 | 1.5346 | v5 55.69 | 2.067 |
| R10 | −22.67868 | d10 = | 0.441 |  |  |  | 2.260 |
| R11 | 22.45673 | d11 = | 0.500 | nd6 | 1.5661 | v6 37.71 | 2.355 |
| R12 | 36.20973 | d12 = | 0.460 |  |  |  | 3.199 |
| R13 | 9.56399 | d13 = | 0.730 | nd7 | 1.5444 | v7 55.82 | 3.711 |
| R14 | 10.38777 | d14 = | 0.391 |  |  |  | 4.066 |
| R15 | 95.80034 | d15 = | 0.706 | nd8 | 1.5346 | v8 55.69 | 4.585 |
| R16 | 3.53477 | d16 = | 0.500 |  |  |  | 4.984 |
| R17 | ∞ | d17 = | 0.210 | ndg | 1.5168 | vg 64.20 | 5.957 |
| R18 | ∞ | d18 = | 0.333 |  |  |  | 6.029 |

Reference wavelength = 588 nm

TABLE 2

| | Conic coefficient | Aspherical coefficient | | | |
|---|---|---|---|---|---|
| | k | A4 | A6 | A8 | A10 |
| R1 | 0.0000E+00 | −1.6723E−02 | 4.6147E−02 | −6.7756E−02 | 5.9977E−02 |
| R2 | 0.0000E+00 | 1.5101E−04 | −7.6419E−03 | 1.2760E−02 | −1.0662E−02 |
| R3 | 0.0000E+00 | 8.9119E−03 | −3.1611E−02 | 5.7696E−02 | −5.8866E−02 |
| R4 | 0.0000E+00 | 4.8027E−03 | 3.2076E−03 | −1.2425E−02 | 2.9497E−02 |
| R5 | 0.0000E+00 | 1.3080E−03 | −9.4873E−02 | 2.0769E−01 | −2.8635E−01 |
| R6 | 0.0000E+00 | 1.0177E−03 | −4.3317E−02 | 6.3576E−02 | −7.3501E−02 |
| R7 | 0.0000E+00 | 2.6435E−02 | −6.8670E−02 | 1.0570E−01 | −1.1585E−01 |
| R8 | 0.0000E+00 | 7.8770E−03 | −4.6850E−02 | 5.9329E−02 | −5.0009E−02 |
| R9 | 0.0000E+00 | 1.3024E−02 | −5.8029E−02 | 5.5556E−02 | −3.5766E−02 |

TABLE 2-continued

| | | | | |
|---|---|---|---|---|
| R10 | 0.0000E+00 | 2.3052E−02 | −5.6074E−02 | 4.5614E−02 | −2.6070E−02 |
| R11 | 0.0000E+00 | 3.4256E−02 | −3.9570E−02 | 1.4699E−02 | −2.0492E−03 |
| R12 | 0.0000E+00 | 3.6612E−02 | −3.8093E−02 | 1.6532E−02 | −4.4494E−03 |
| R13 | 0.0000E+00 | 7.1699E−03 | −2.1950E−02 | 6.2175E−03 | −8.3335E−04 |
| R14 | 0.0000E+00 | 2.4325E−02 | −2.2430E−02 | 7.0193E−03 | −1.2263E−03 |
| R15 | 0.0000E+00 | −2.1230E−02 | −1.6842E−03 | 2.4180E−03 | −5.5687E−04 |
| R16 | −1.0000E+00 | −4.2641E−02 | 7.2519E−03 | −8.2657E−04 | 5.8164E−05 |

| Aspherical coefficient | | | | |
|---|---|---|---|---|
| | A12 | A14 | A16 | A18 | A20 |
| R1 | −3.3401E−02 | 1.1814E−02 | −2.5787E−03 | 3.1703E−04 | −1.6833E−05 |
| R2 | 5.5962E−03 | −1.9258E−03 | 4.2080E−04 | −5.2189E−05 | 2.6994E−06 |
| R3 | 3.8013E−02 | −1.5650E−02 | 3.9795E−03 | −5.6638E−04 | 3.4319E−05 |
| R4 | −3.5007E−02 | 2.4050E−02 | −9.5928E−03 | 2.0685E−03 | −1.8487E−04 |
| R5 | 2.5015E−01 | −1.3832E−01 | 4.6990E−02 | −8.9420E−03 | 7.2940E−04 |
| R6 | 5.4112E−02 | −2.4146E−02 | 6.5095E−03 | −9.8120E−04 | 6.3289E−05 |
| R7 | 7.7952E−02 | −3.1705E−02 | 7.7106E−03 | −1.0367E−03 | 5.9359E−05 |
| R8 | 2.7128E−02 | −9.4723E−03 | 2.0851E−03 | −2.6513E−04 | 1.4960E−05 |
| R9 | 1.5248E−02 | −4.2725E−03 | 7.7907E−04 | −8.4536E−05 | 4.0948E−06 |
| R10 | 1.0362E−02 | −2.7789E−03 | 4.7827E−04 | −4.7082E−05 | 1.9884E−06 |
| R11 | −6.9170E−04 | 3.7420E−04 | −7.3311E−05 | 6.6390E−06 | −2.1524E−07 |
| R12 | 7.7033E−04 | −8.5281E−05 | 5.8337E−08 | −2.2546E−07 | 3.7799E−09 |
| R13 | 6.2452E−05 | −2.6919E−06 | 6.3935E−08 | −7.0328E−10 | 1.2535E−12 |
| R14 | 1.3186E−04 | −9.0588E−06 | 3.9324E−07 | −9.9822E−09 | 1.1354E−10 |
| R15 | 6.2719E−05 | −4.0191E−06 | 1.5002E−07 | −3.0536E−09 | 2.6299E−11 |
| R16 | −2.4860E−06 | 5.5013E−08 | −2.8724E−11 | −2.4788E−11 | 3.5180E−13 |

TABLE 3

| | |
|---|---|
| 2ω (°) | 81.91 |
| Fno | 1.75 |
| f (mm) | 6.765 |
| f1 (mm) | 5.630 |
| f2 (mm) | −16.313 |
| f3 (mm) | −46.984 |
| f4 (mm) | 32.455 |
| f5 (mm) | 29.631 |
| f6 (mm) | 103.091 |
| f7 (mm) | 168.789 |
| f8 (mm) | −6.884 |
| TTL (mm) | 7.951 |
| LB (mm) | 1.043 |
| IH (mm) | 6.016 |
| TTL/IH | 1.322 |

The following Table 13 shows the corresponding values of the parameters defined in the conditions (1) to (5) of the first to fourth embodiments.

Figure 2:
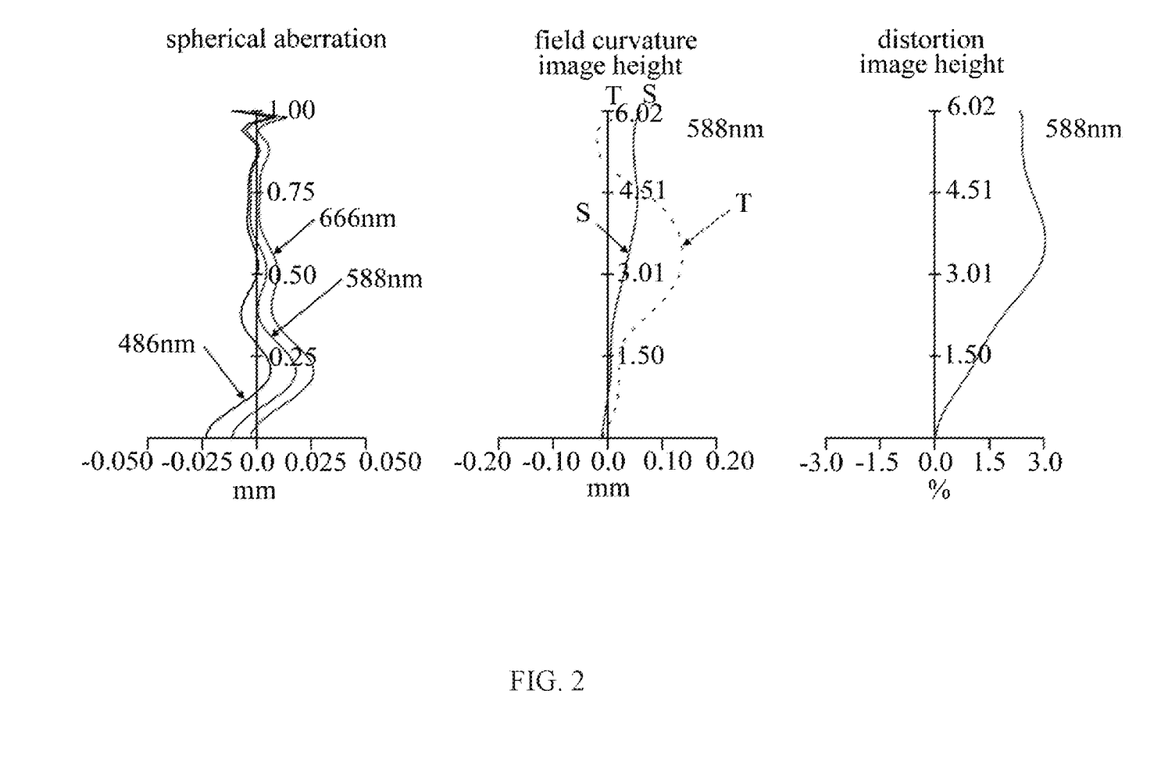
FIG. 2 is diagrams of a spherical aberration, a field curvature, a distortion of the camera lens LA according to the first embodiment of the present invention.

FIG. 2 illustrates a spherical aberration, a field curvature, and a distortion of the camera lens LA according to the first embodiment. In addition, in FIG. 2, S is a field curvature for a sagittal image plane, and T is a field curvature for a meridional image plane, which are the same for the second to fourth embodiments. As shown in FIG. 2, the camera lens LA according to the first embodiment has 2ω=81.91°, the wide-angle and small height, i.e., TTL/IH=1.322, and good optical properties.

Second Embodiment

Figure 3:
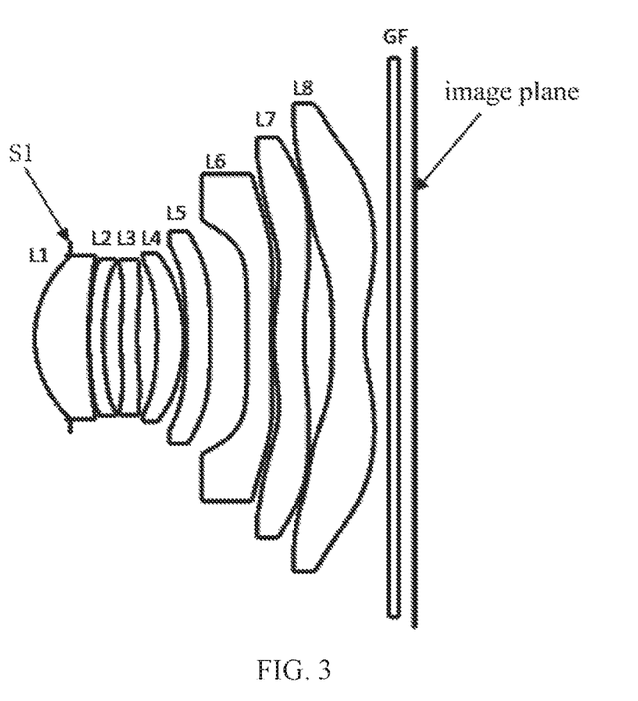
FIG. 3 is a schematic diagram of a camera lens LA according to a second embodiment of the present invention.

FIG. 3 is a schematic diagram of a camera lens LA according to a second embodiment of the present invention.

The curvature radiuses R of the image side surfaces and object side surfaces of the first lens L1 to the eighth lens L8 of the camera lens LA according to the second embodiment, the center thicknesses of the lenses, or distances d between the lenses, refractive indexes nd, abbe numbers v are shown in Table 4; conic coefficients k and aspheric coefficients are shown in Table 5; and 2ω, Fno, f, f1, f2, f3, f4, f5, f6, f7, f8, TTL, and IH are shown in Table 6.

TABLE 4

| | R | d | | nd | | vd | Effective radius (mm) |
|---|---|---|---|---|---|---|---|
| S1 | ∞ | d0 = | −0.744 | | | | 1.743 |
| R1 | 2.36876 | d1 = | 1.119 | nd1 | 1.4586 | v1 90.19 | 1.749 |
| R2 | 7.11297 | d2 = | 0.025 | | | | 1.691 |
| R3 | 8.40880 | d3 = | 0.290 | nd2 | 1.6797 | v2 18.42 | 1.679 |
| R4 | 7.02143 | d4 = | 0.387 | | | | 1.582 |
| R5 | 8.24860 | d5 = | 0.350 | nd3 | 1.6797 | v3 18.42 | 1.580 |
| R6 | 8.32652 | d6 = | 0.400 | | | | 1.650 |
| R7 | −7.32436 | d7 = | 0.566 | nd4 | 1.5346 | v4 55.69 | 1.684 |
| R8 | −3.01947 | d8 = | 0.050 | | | | 1.800 |
| R9 | −7.51622 | d9 = | 0.500 | nd5 | 1.5346 | v5 55.69 | 1.994 |
| R10 | −25.80239 | d10 = | 0.780 | | | | 2.268 |
| R11 | −36.23215 | d11 = | 0.500 | nd6 | 1.5661 | v6 37.71 | 2.491 |
| R12 | 28.94551 | d12 = | 0.050 | | | | 3.492 |
| R13 | 5.70507 | d13 = | 0.630 | nd7 | 1.5444 | v7 55.82 | 3.850 |
| R14 | 11.08959 | d14 = | 0.587 | | | | 4.267 |
| R15 | −92.57578 | d15 = | 0.680 | nd8 | 1.5346 | v8 55.69 | 4.692 |
| R16 | 3.33456 | d16 = | 0.500 | | | | 4.988 |
| R17 | ∞ | d17 = | 0.210 | ndg | 1.5168 | vg 64.20 | 5.886 |
| R18 | ∞ | d18 = | 0.345 | | | | 5.959 |

Reference wavelength = 588 nm

TABLE 5

| | Conic coefficient | Aspherical coefficient | | | |
|---|---|---|---|---|---|
| | k | A4 | A6 | A8 | A10 |
| R1 | 0.0000E+00 | −1.6089E−02 | 4.5035E−02 | −6.7180E−02 | 5.9917E−02 |
| R2 | 0.0000E+00 | −1.3184E−02 | −3.3708E−02 | 7.1662E−02 | −7.4066E−02 |

TABLE 5-continued

| | | | | |
|---|---|---|---|---|
| R3 | 0.0000E+00 | −6.7599E−03 | −2.7011E−02 | 6.4415E−02 | −7.2521E−02 |
| R4 | 0.0000E+00 | −8.4584E−03 | 4.0236E−02 | −8.3592E−02 | 1.1106E−01 |
| R5 | 0.0000E+00 | −2.5838E−02 | 1.1048E−02 | −4.4833E−02 | 6.7752E−02 |
| R6 | 0.0000E+00 | −1.6343E−02 | −1.0889E−03 | −1.1942E−02 | 1.6087E−02 |
| R7 | 0.0000E+00 | 3.7662E−03 | −2.8912E−02 | 4.6580E−02 | −4.9788E−02 |
| R8 | 0.0000E+00 | 4.9914E−02 | −5.2257E−02 | 4.4640E−02 | −3.6505E−02 |
| R9 | 0.0000E+00 | 4.1951E−02 | −5.7259E−02 | 4.9918E−02 | −3.5396E−02 |
| R10 | 0.0000E+00 | −1.5650E−02 | −1.3835E−02 | 5.4819E−03 | −6.5209E−03 |
| R11 | 0.0000E+00 | 4.5576E−03 | −8.0410E−03 | 5.5113E−03 | −3.9356E−03 |
| R12 | 0.0000E+00 | 5.2588E−04 | −3.2230E−03 | 6.3657E−04 | −1.3549E−04 |
| R13 | 0.0000E+00 | −1.1479E−02 | −6.4349E−03 | 1.3541E−03 | −2.8062E−05 |
| R14 | 0.0000E+00 | 1.1576E−02 | −1.2103E−02 | 3.5909E−03 | −5.9591E−04 |
| R15 | 0.0000E+00 | −3.2712E−02 | 1.4591E−02 | 1.5868E−03 | −3.6533E−04 |
| R16 | −1.0000E+00 | −4.5012E−02 | 8.0913E−03 | −1.1010E−03 | 1.0859E−04 |

| | Aspherical coefficient | | | | |
|---|---|---|---|---|---|
| | A12 | A14 | A16 | A18 | A20 |
| R1 | −3.3434E−02 | 1.1811E−02 | −2.5747E−03 | 3.1773E−04 | −1.7188E−05 |
| R2 | 4.7928E−02 | −1.9415E−02 | 4.7479E−03 | −6.4505E−04 | 3.7594E−05 |
| R3 | 5.1381E−02 | −2.2848E−02 | 6.1968E−03 | −9.3810E−04 | 6.0911E−05 |
| R4 | −9.3683E−02 | 5.0920E−02 | −1.7260E−02 | 3.3324E−03 | −2.7820E−04 |
| R5 | −6.2659E−02 | 3.6486E−02 | −1.2999E−02 | 2.6234E−03 | −2.3146E−04 |
| R6 | −1.2017E−02 | 5.5431E−03 | −1.5327E−03 | 2.5581E−04 | −2.0793E−05 |
| R7 | 3.1388E−02 | −1.2100E−02 | 2.6957E−03 | −2.8255E−04 | 7.4246E−06 |
| R8 | 2.3445E−02 | −1.0544E−02 | 3.0323E−03 | −4.9250E−04 | 3.4227E−05 |
| R9 | 1.7723E−02 | −5.9165E−03 | 1.2579E−03 | −1.5326E−04 | 8.0634E−08 |
| R10 | 3.7862E−03 | −1.2702E−03 | 2.5230E−04 | −2.7300E−05 | 1.2290E−08 |
| R11 | 1.6729E−03 | −4.4674E−04 | 7.2593E−05 | −6.5251E−06 | 2.4965E−07 |
| R12 | 3.1145E−05 | −4.3627E−06 | 3.3455E−07 | −1.3274E−08 | 2.1578E−10 |
| R13 | −1.7952E−05 | 2.3947E−06 | −1.3695E−07 | 3.7347E−09 | −3.8280E−11 |
| R14 | 6.2993E−05 | −4.4229E−06 | 2.0080E−07 | −5.3019E−09 | 6.1234E−11 |
| R15 | 3.7809E−05 | −2.2026E−06 | 7.4895E−08 | −1.3819E−09 | 1.0914E−11 |
| R16 | −7.7787E−03 | 3.8929E−07 | −1.2640E−08 | 2.3647E−10 | −1.9269E−12 |

TABLE 6

| | |
|---|---|
| 2ω (°) | 81.27 |
| Fno | 1.95 |
| f (mm) | 6.796 |
| f1 (mm) | 7.201 |
| f2 (mm) | −68.484 |
| f3 (mm) | 460.256 |
| f4 (mm) | 9.189 |
| f5 (mm) | −20.030 |
| f6 (mm) | −28.346 |
| f7 (mm) | 20.729 |
| f8 (mm) | −6.006 |
| TTL (mm) | 7.950 |
| LB (mm) | 1.055 |
| IH (mm) | 6.016 |
| TTL/IH | 1.321 |

As shown in Table 13, the second embodiment satisfies the conditions (1) to (5).

Figure 4:
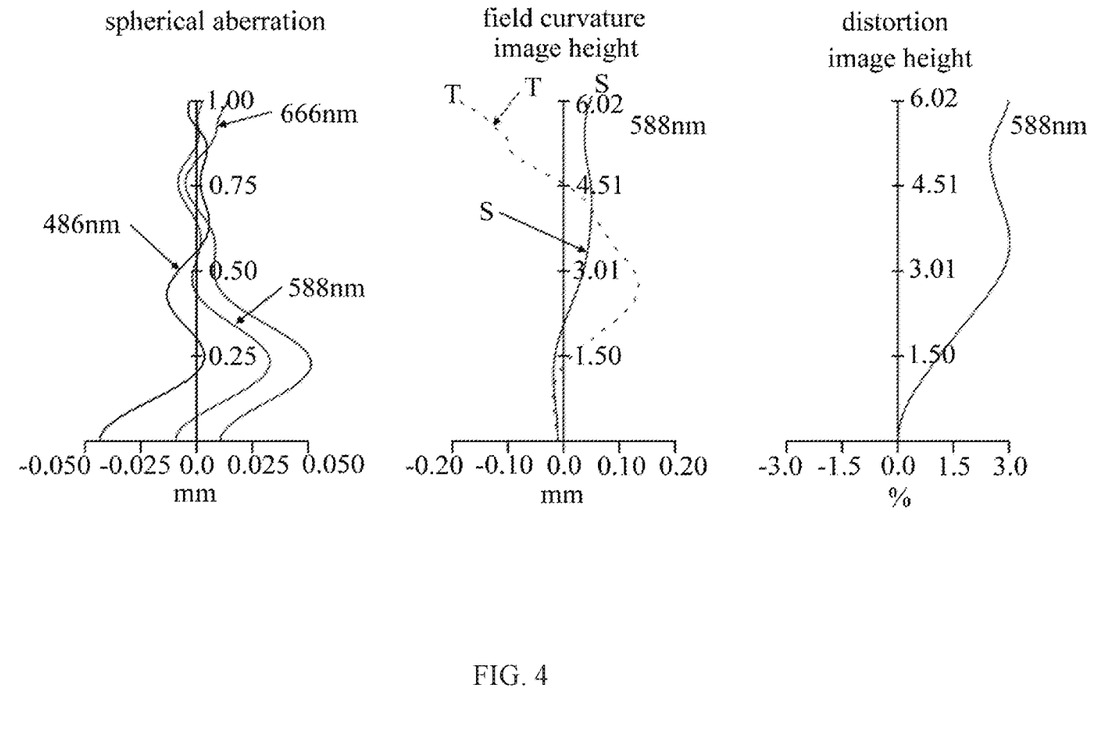
FIG. 4 is diagrams of a spherical aberration, a field curvature, a distortion of the camera lens LA according to the second embodiment of the present invention.

FIG. 4 illustrates a spherical aberration, a field curvature, and a distortion of the camera lens LA according to the second embodiment. As shown in FIG. 4, the camera lens LA according to the second embodiment has 2ω=81.27°, the wide-angle and small height, i.e., TTL/IH=1.321, and good optical properties.

Third Embodiment

Figure 5:
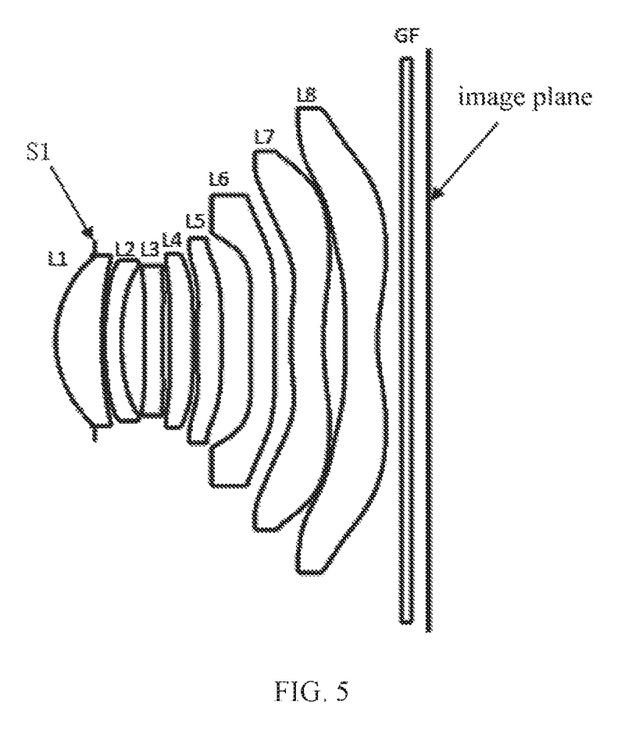
FIG. 5 is a schematic diagram of a camera lens LA according to a third embodiment of the present invention.

FIG. 5 is a schematic diagram of a camera lens LA according to a third embodiment of the present invention. The curvature radiuses R of the image side surfaces and object side surfaces of the first lens L1 to the eighth lens L8 of the camera lens LA according to the third embodiment, the center thicknesses of the lenses, or distances d between the lenses, refractive indexes nd, abbe numbers v are shown in Table 7; conic coefficients k and aspheric coefficients are shown in Table 8; and 2ω, Fno, f, f1, f2, f3, f4, f5, f6, f7, f8, TTL, and IH are shown in Table 9.

TABLE 7

| | R | d | | nd | | vd | Effective radius (mm) |
|---|---|---|---|---|---|---|---|
| S1 | ∞ | d0 = | −0.821 | | | | 1.823 |
| R1 | 2.41943 | d1 = | 0.962 | nd1 | 1.5267 | v1 76.60 | 1.828 |
| R2 | 7.57944 | d2 = | 0.055 | | | | 1.751 |
| R3 | 6.13171 | d3 = | 0.351 | nd2 | 1.6700 | v2 19.39 | 1.714 |
| R4 | 4.64873 | d4 = | 0.480 | | | | 1.560 |
| R5 | 20.34522 | d5 = | 0.380 | nd3 | 1.6700 | v3 19.39 | 1.560 |
| R6 | 13.51866 | d6 = | 0.148 | | | | 1.600 |
| R7 | −47.03972 | d7 = | 0.503 | nd4 | 1.5346 | v4 55.69 | 1.691 |
| R8 | −17.75276 | d8 = | 0.086 | | | | 1.853 |
| R9 | 34.63358 | d9 = | 0.500 | nd5 | 1.5346 | v5 55.69 | 1.999 |
| R10 | −30.28850 | d10 = | 0.607 | | | | 2.179 |
| R11 | 194.18962 | d11 = | 0.500 | nd6 | 1.5681 | v6 37.71 | 2.280 |
| R12 | −53.54019 | d12 = | 0.346 | | | | 3.097 |
| R13 | 8.68596 | d13 = | 0.686 | nd7 | 1.5444 | v7 55.82 | 3.639 |
| R14 | 10.02567 | d14 = | 0.445 | | | | 4.043 |
| R15 | 143.34273 | d15 = | 0.680 | nd8 | 1.5346 | v8 55.69 | 4.627 |
| R16 | 3.40652 | d16 = | 0.500 | | | | 4.960 |
| R17 | ∞ | d17 = | 0.210 | ndg | 1.5168 | vg 64.20 | 5.940 |
| R18 | ∞ | d18 = | 0.363 | | | | 6.014 |

Reference wavelength = 588 nm

TABLE 8

| | Conic coefficient | Aspherical coefficient | | | |
|---|---|---|---|---|---|
| | k | A4 | A6 | A8 | A10 |
| R1 | 0.0000E+00 | −1.7099E−02 | 4.6259E−02 | −6.7713E−02 | 6.0002E−02 |
| R2 | 0.0000E+00 | −2.8092E−02 | 2.6872E−02 | −7.6819E−03 | −8.4064E−03 |
| R3 | 0.0000E+00 | −2.6655E−02 | 2.7580E−02 | −6.8939E−03 | −9.0032E−03 |
| R4 | 0.0000E+00 | −8.6807E−03 | 2.7104E−02 | −3.5637E−02 | 3.5354E−02 |
| R5 | 0.0000E+00 | −7.3822E−03 | −6.2682E−02 | 1.2774E−01 | −1.6647E−01 |
| R6 | 0.0000E+00 | −1.0882E−02 | −1.3901E−02 | 3.4538E−03 | 7.4609E−03 |
| R7 | 0.0000E+00 | 2.4963E−02 | −5.3985E−02 | 6.6267E−02 | −6.1762E−02 |
| R8 | 0.0000E+00 | 4.0791E−02 | −9.3661E−02 | 8.6730E−02 | −4.9334E−02 |
| R9 | 0.0000E+00 | 3.4536E−02 | −9.5192E−02 | 7.9821E−02 | −3.8708E−02 |
| R10 | 0.0000E+00 | 5.4229E−02 | −2.5665E−02 | 1.2770E−02 | −3.3136E−03 |
| R11 | 0.0000E+00 | 2.4471E−02 | −3.0525E−02 | 1.5199E−02 | −8.1202E−03 |
| R12 | 0.0000E+00 | 3.3099E−02 | −3.1387E−02 | 1.1717E−02 | −2.9125E−03 |
| R13 | 0.0000E+00 | 1.4785E−02 | −2.8664E−02 | 8.7162E−03 | −1.3277E−03 |
| R14 | 0.0000E+00 | 3.3325E−02 | −2.9288E−02 | 9.3703E−03 | −1.7004E−03 |
| R15 | 0.0000E+00 | −1.9849E−02 | −2.6614E−03 | 2.5231E−03 | −5.3566E−04 |
| R16 | −1.0000E+00 | −4.6123E−02 | 7.9454E−03 | −9.0024E−04 | 6.1158E−05 |

| | Aspherical coefficient | | | | |
|---|---|---|---|---|---|
| | A12 | A14 | A16 | A18 | A20 |
| R1 | −3.3409E−02 | 1.1811E−02 | −2.5789E−03 | 3.1794E−04 | −1.6958E−05 |
| R2 | 1.0987E−02 | −5.9423E−03 | 1.7608E−03 | −2.7599E−04 | 1.7707E−05 |
| R3 | 1.0957E−02 | −5.5640E−03 | 1.5190E−03 | −2.0781E−04 | 1.0153E−05 |
| R4 | −2.2859E−02 | 9.2166E−03 | −2.0308E−03 | 1.7095E−04 | 8.5780E−06 |
| R5 | 1.3993E−01 | −7.5738E−02 | 2.5678E−02 | −4.9648E−03 | 4.1936E−04 |
| R6 | −1.1736E−02 | 8.5688E−03 | −3.2578E−03 | 6.3585E−04 | −5.0801E−05 |
| R7 | 3.6286E−02 | −1.2986E−02 | 2.8665E−03 | −3.7799E−04 | 2.4017E−05 |
| R8 | 1.4752E−02 | −1.1631E−03 | −4.8751E−04 | 1.2750E−04 | −8.9795E−06 |
| R9 | 7.9901E−03 | 1.1678E−03 | −9.2762E−04 | 1.7125E−04 | −1.0917E−05 |
| R10 | 5.6814E−05 | 2.3474E−04 | −6.1625E−05 | 6.3570E−06 | −2.4130E−07 |
| R11 | 3.6441E−03 | −1.1698E−03 | 2.3801E−04 | −2.7290E−05 | 1.3429E−06 |
| R12 | 5.1028E−04 | −6.0386E−05 | 4.5338E−06 | −1.9454E−07 | 3.6392E−09 |
| R13 | 1.1702E−04 | −5.9259E−06 | 1.4381E−07 | −7.1295E−11 | −4.7885E−11 |
| R14 | 1.9330E−04 | −1.4213E−05 | 6.6206E−07 | −1.7856E−08 | 2.1302E−10 |
| R15 | 5.7254E−05 | −3.5231E−06 | 1.2712E−07 | −2.5117E−09 | 2.1062E−11 |
| R16 | −2.3289E−06 | 3.3021E−08 | 8.8865E−10 | −4.1408E−11 | 4.6049E−13 |

TABLE 9

| 2ω (°) | 81.72 |
|---|---|
| Fno | 1.85 |
| f (mm) | 6.744 |
| f1 (mm) | 6.340 |
| f2 (mm) | −31.696 |
| f3 (mm) | −61.510 |
| f4 (mm) | 53.023 |
| f5 (mm) | 30.307 |
| f6 (mm) | 74.193 |
| f7 (mm) | 101.153 |
| f8 (mm) | −6.539 |
| TTL (mm) | 7.801 |
| LB (mm) | 1.073 |
| IH (mm) | 6.016 |
| TTL/IH | 1.297 |

As shown in Table 13, the third embodiment satisfies the conditions (1) to (5).

Figure 6:
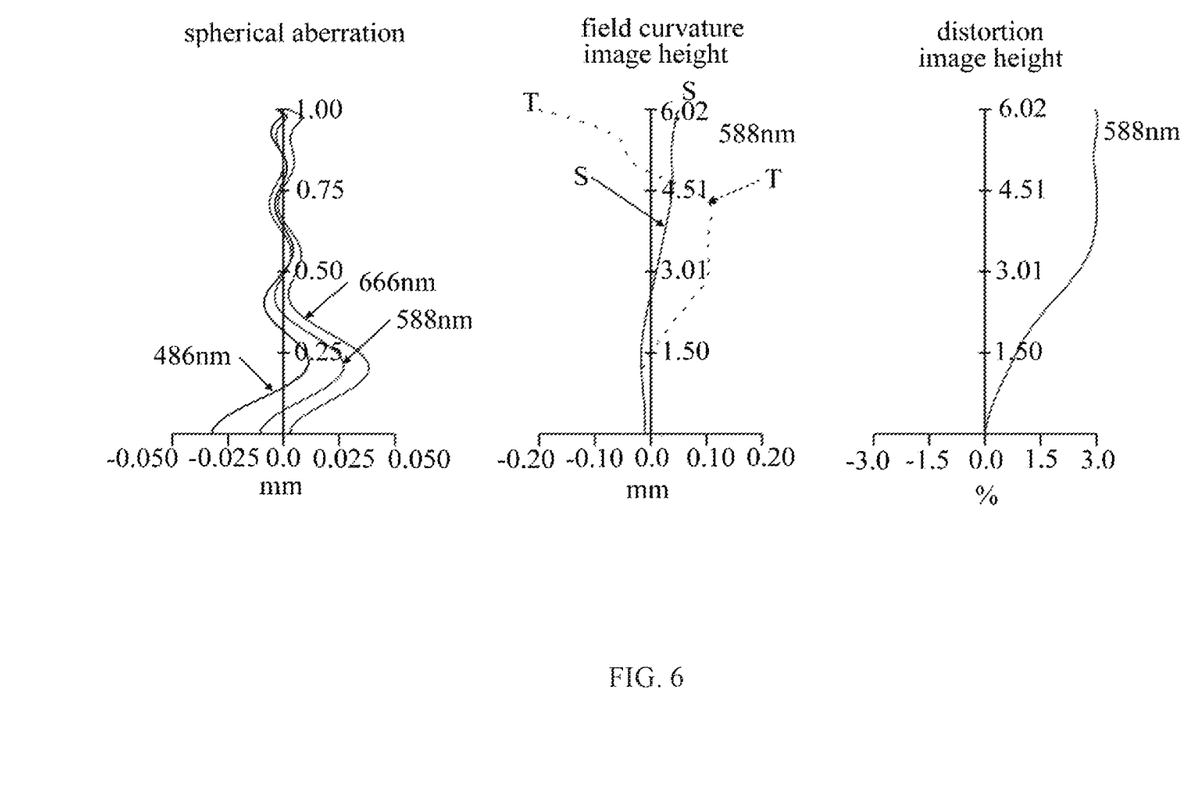
FIG. 6 is diagrams of a spherical aberration, a field curvature, a distortion of the camera lens LA according to the third embodiment of the present invention.

FIG. 6 illustrates a spherical aberration, a field curvature, and a distortion of the camera lens LA according to the third embodiment. As shown in FIG. 6, the camera lens LA according to the second embodiment has 2ω=81.72°, the wide-angle and small height, i.e., TTL/IH=1.297, and good optical properties.

Fourth Embodiment

Figure 7:
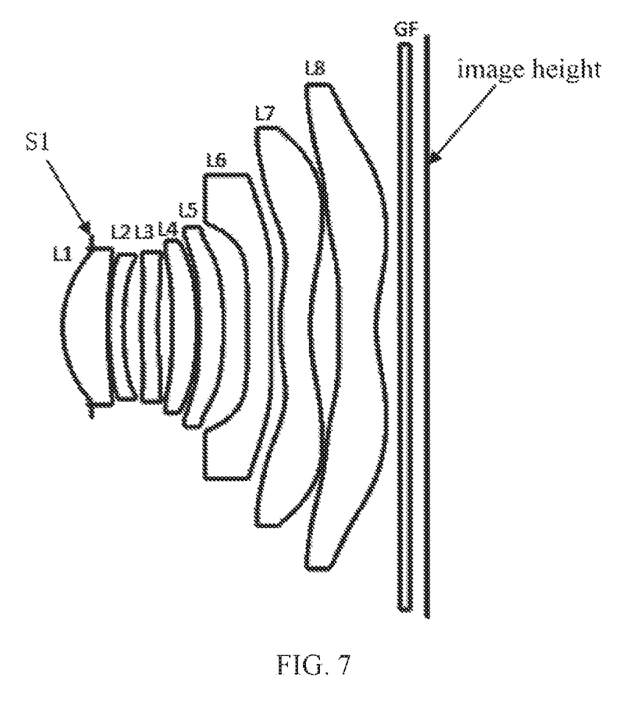
FIG. 7 is a schematic diagram of a camera lens LA according to a fourth embodiment of the present invention.

FIG. 7 is a schematic diagram of a camera lens LA according to a fourth embodiment of the present invention. The curvature radiuses R of the image side surfaces and object side surfaces of the first lens L1 to the eighth lens L8 of the camera lens LA according to the fourth embodiment, the center thicknesses of the lenses, or distances d between the lenses, refractive indexes nd, abbe numbers v are shown in Table 10; conic coefficients k and aspheric coefficients are shown in Table 11; and 2ω, Fno, f, f1, f2, f3, f4, f5, f6, f7, f8, TTL, and IH are shown in Table 12.

TABLE 10

| | R | d | | nd | | vd | Effective radius (mm) |
|---|---|---|---|---|---|---|---|
| S1 | ∞ | d0 = | −0.603 | | | | 1.650 |
| R1 | 2.35712 | d1 = | 0.929 | nd1 | 1.4959 | v1 | 81.65 | 1.654 |
| R2 | 7.98881 | d2 = | 0.040 | | | | 1.584 |
| R3 | 7.75405 | d3 = | 0.300 | nd2 | 1.6797 | v2 | 18.42 | 1.543 |

TABLE 10-continued

|  | R | d |  | nd |  | vd | Effective radius (mm) |
|---|---|---|---|---|---|---|---|
| R4 | 5.80646 | d4 = | 0.374 |  |  |  | 1.430 |
| R5 | 8.29192 | d5 = | 0.350 | nd3 | 1.6797 | v3 18.42 | 1.482 |
| R6 | 8.37221 | d6 = | 0.293 |  |  |  | 1.583 |
| R7 | −12.56221 | d7 = | 0.515 | nd4 | 1.5346 | v4 55.69 | 1.650 |
| R8 | −5.15891 | d8 = | 0.052 |  |  |  | 1.827 |
| R9 | −6.79749 | d9 = | 0.500 | nd5 | 1.5346 | v5 55.69 | 1.910 |
| R10 | −7.93210 | d10 = | 0.502 |  |  |  | 2.125 |
| R11 | −435.37661 | d11 = | 0.500 | nd6 | 1.5661 | v6 37.71 | 2.225 |
| R12 | 153.06980 | d12 = | 0.184 |  |  |  | 3.237 |
| R13 | 5.72727 | d13 = | 0.630 | nd7 | 1.5444 | v7 55.82 | 3.900 |
| R14 | 6.17231 | d14 = | 0.581 |  |  |  | 4.229 |
| R15 | 25.62967 | d15 = | 0.785 | nd8 | 1.5346 | v8 55.69 | 4.900 |
| R16 | 3.16073 | d16 = | 0.500 |  |  |  | 5.510 |
| R17 | ∞ | d17 = | 0.210 | ndg | 1.5168 | vg 64.20 | 5.937 |
| R18 | ∞ | d18 = | 0.356 |  |  |  | 6.006 |

Reference wavelength = 588 nm

TABLE 11

| | Conic coefficient | Aspherical coefficient | | | |
|---|---|---|---|---|---|
| | k | A4 | A6 | A8 | A10 |
| R1 | 0.0000E+00 | −1.5779E−02 | 4.4496E−02 | −6.7167E−02 | 5.9885E−02 |
| R2 | 0.0000E+00 | −5.1157E−03 | −3.9590E−02 | 7.1123E−02 | −7.4144E−02 |
| R3 | 0.0000E+00 | −1.6403E−03 | −2.7082E−02 | 6.4411E−02 | −7.2454E−02 |
| R4 | 0.0000E+00 | −8.5545E−03 | 4.2152E−02 | −8.3281E−02 | 1.1107E−01 |
| R5 | 0.0000E+00 | −1.6503E−02 | −2.6278E−02 | 6.2070E−02 | −1.0623E−01 |
| R6 | 0.0000E+00 | −7.7201E−03 | −1.7557E−02 | 1.6213E−02 | −9.5697E−03 |
| R7 | 0.0000E+00 | 7.8616E−03 | −3.1555E−02 | 3.6222E−02 | −2.0725E−02 |
| R8 | 0.0000E+00 | 4.9518E−02 | 2.0337E−03 | −9.6399E−02 | 1.2118E−01 |
| R9 | 0.0000E+00 | 5.8670E−02 | −1.6006E−02 | −5.2284E−02 | 6.5495E−02 |
| R10 | 0.0000E+00 | −7.8017E−03 | −4.1215E−02 | 1.6780E−02 | −2.5826E−02 |
| R11 | 0.0000E+00 | −1.9307E−02 | 1.2088E−02 | −3.8168E−03 | −6.0658E−03 |
| R12 | 0.0000E+00 | −5.8452E−03 | 3.7258E−03 | −3.8353E−03 | 1.3327E−03 |
| R13 | 0.0000E+00 | 2.7818E−03 | −1.7006E−02 | 4.0229E−03 | −3.5298E−04 |
| R14 | 0.0000E+00 | 1.9964E−02 | −1.8779E−02 | 5.6296E−03 | −9.7343E−04 |
| R15 | 0.0000E+00 | −3.7592E−02 | 6.1122E−03 | 2.9327E−04 | −1.8941E−04 |
| R16 | −1.0000E+00 | −4.9131E−02 | 9.6429E−03 | −1.4895E−03 | 1.6664E−04 |

| | Aspherical coefficient | | | | |
|---|---|---|---|---|---|
| | A12 | A14 | A16 | A18 | A20 |
| R1 | −3.3456E−02 | 1.1804E−02 | −2.5737E−03 | 3.1784E−04 | −1.7393E−05 |
| R2 | 4.7925E−02 | −1.9709E−02 | 4.7495E−03 | −6.4442E−04 | 3.7340E−05 |
| R3 | 5.1408E−02 | −2.2837E−02 | 6.1953E−03 | −9.3810E−04 | 6.0618E−05 |
| R4 | −9.3654E−02 | 5.0951E−02 | −1.7241E−02 | 3.3387E−03 | −2.8233E−04 |
| R5 | 1.0999E−01 | −7.0148E−02 | 2.7113E−02 | −5.7763E−03 | 5.1805E−04 |
| R6 | −4.2793E−04 | 4.6090E−03 | −2.7865E−03 | 7.4602E−04 | −7.9400E−05 |
| R7 | −3.8646E−03 | 1.2374E−02 | −6.8647E−03 | 1.8634E−03 | −1.5385E−04 |
| R8 | −8.7859E−02 | 4.0819E−02 | −1.1500E−02 | 1.7408E−03 | −1.0749E−04 |
| R9 | −4.9623E−02 | 2.5151E−02 | −7.5978E−03 | 1.2143E−03 | −7.9085E−05 |
| R10 | 1.7329E−02 | −8.5026E−03 | 1.4444E−03 | −1.7631E−04 | 9.0273E−06 |
| R11 | 5.7652E−03 | −2.4956E−03 | 6.0317E−04 | −7.8017E−05 | 4.1929E−06 |
| R12 | −2.3615E−04 | 2.4234E−05 | −1.4638E−06 | 4.8292E−08 | −6.6609E−10 |
| R13 | −1.1725E−06 | 2.7876E−06 | −2.3667E−07 | 8.7059E−09 | −1.2466E−10 |
| R14 | 1.0773E−04 | −7.8674E−06 | 3.6878E−07 | −1.0034E−08 | 1.1985E−10 |
| R15 | 2.3819E−05 | −1.5108E−06 | 5.3474E−08 | −1.0080E−09 | 7.9074E−12 |
| R16 | −1.2989E−05 | 6.7252E−07 | −2.1709E−08 | 3.9232E−10 | −3.0219E−12 |

TABLE 12

| 2ω (°) | 84.50 |
| Fno | 1.95 |
| f (mm) | 6.437 |
| f1 (mm) | 6.393 |
| f2 (mm) | −36.273 |

TABLE 12-continued

| f3 (mm) | 460.256 |
| f4 (mm) | 15.988 |
| f5 (mm) | −105.017 |
| f6 (mm) | −200.000 |
| f7 (mm) | 97.341 |

TABLE 12-continued

| f8 (mm) | −6.827 |
| TTL (mm) | 7.601 |
| LB (mm) | 1.066 |
| IH (mm) | 6.016 |
| TTL/IH | 1.263 |

As shown in Table 13, the fourth embodiment satisfies the conditions (1) to (5).

Figure 8:
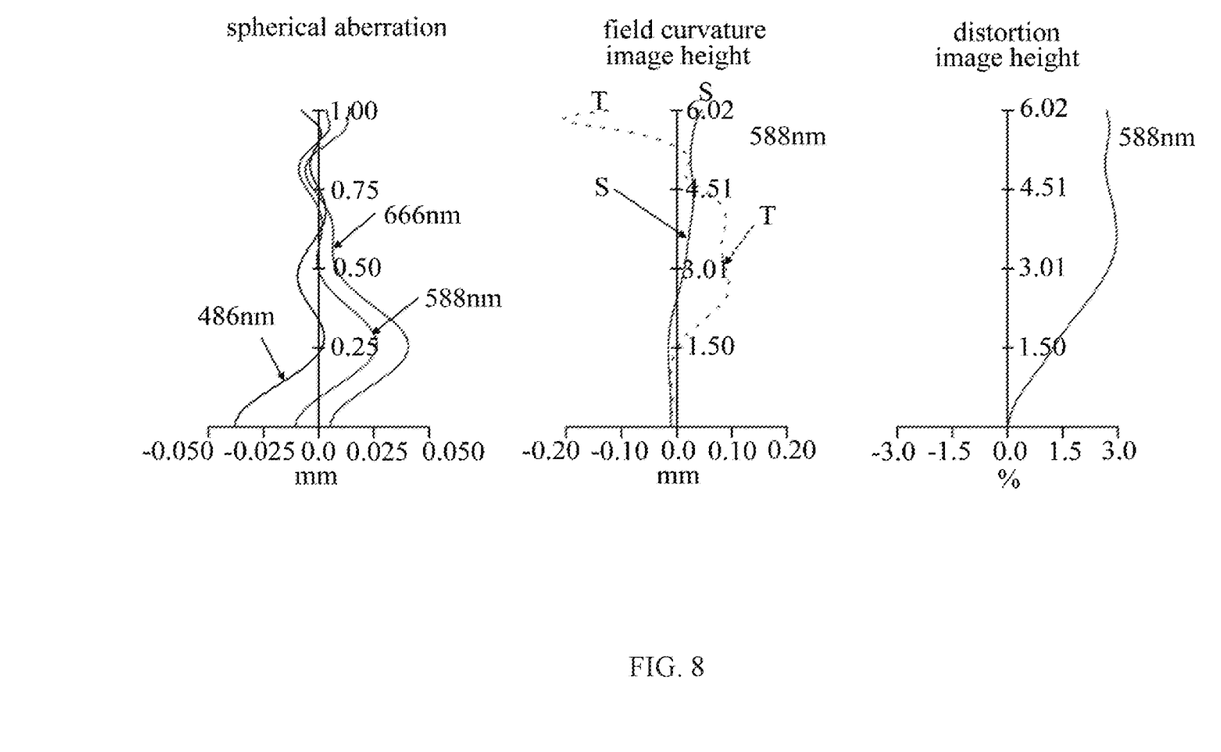
FIG. 8 is diagrams of a spherical aberration, a field curvature, a distortion of the camera lens LA according to the fourth embodiment of the present invention.

FIG. 8 illustrates a spherical aberration, a field curvature, and a distortion of the camera lens LA according to the fourth embodiment. As shown in FIG. 8, the camera lens LA according to the second embodiment has 2ω=84.50°, the wide-angle and small height, i.e., TTL/IH=1.263, and good optical properties.

TABLE 13

| | Embodiment 1 | Embodiment 2 | Embodiment 3 | Embodiment 4 | Notes |
|---|---|---|---|---|---|
| v1/v2 | 3.034 | 4.897 | 3.950 | 4.433 | condition (1) |
| v1/v3 | 3.034 | 4.897 | 3.950 | 4.433 | condition (2) |
| d10/f | 0.065 | 0.115 | 0.090 | 0.078 | condition (3) |
| f1/f2 | −0.345 | −0.105 | −0.200 | −0.176 | condition (4) |
| f7/f | 24.950 | 3.050 | 15.000 | 15.122 | condition (5) |

What is claimed is:

1. A camera lens, comprising, sequentially from an object side:

a first lens having a positive refractive power;
a second lens having a negative refractive power;
a third lens;
a fourth lens having a positive refractive power;
a fifth lens;
a sixth lens;
a seventh lens having a positive refractive power; and
an eighth lens having a negative refractive power,
wherein the camera lens satisfies following conditions:

$$3.00 \le v1/v2 \le 5.00;$$

$$3.00 \le v1/v3 \le 5.00;$$

$$0.06 \le d10/f \le 0.12, \text{ and}$$

$$-0.20 \le f1/f2 \le -0.10, \text{ and}$$

where;
v1 denotes an abbe number of the first lens;
v2 denotes an abbe number of the second lens;
v3 denotes an abbe number of the third lens;
f denotes a focal length of the camera lens;
d10 denotes an on-axis distance from an image side surface of the fifth lens to an object side surface of the sixth lens;
f1 denotes a focal length of the first lens; and
f2 denotes a focal length of the second lens.

2. The camera lens as described in claim 1, further satisfying a following condition:

$$3.00 \le f7/f \le 25.00,$$

where f7 denotes a focal length of the seventh lens.

* * * * *